Aug. 14, 1962 R. C. VOIGE 3,049,591
ELECTRONIC SYSTEM
Filed Nov. 23, 1960 2 Sheets-Sheet 2

INVENTOR.
Raymond C. Voige.
BY
Mueller & Aichele
ATTYS.

United States Patent Office  3,049,591
Patented Aug. 14, 1962

3,049,591
ELECTRONIC SYSTEM
Raymond C. Voige, Chicago, Ill., assignor to Motorola, Inc., Chicago, Ill., a corporation of Illinois
Filed Nov. 23, 1960, Ser. No. 71,209
16 Claims. (Cl. 178—7.3)

This invention relates to power supplies for electronic apparatus and more particularly to a power supply for a transistorized television receiver which is operative from either a self-contained battery or a power line alternating current supply.

With the increased use of transistors in electronic apparatus, due primarily to lower costs and improved technical specifications of transistors, there has been considerable interest in constructing consumer type entertainment apparatus in portable battery operated form. However, while some products such as low power radios can be practically operated from small generally available batteries, higher powered apparatus should also be operable from the A.C. power line in order to permit conserving the battery energy or in case the battery is not in a useful energy state. While transistorized television receivers with usual screen size have not heretofore been commercially available, it will be recognized that such receivers would have substantial power requirements and therefore should be operable from the alternating current power line or a self-contained battery and that the battery would preferably be rechargeable with but a minimum of attention or manipulation by an ordinary television viewer who is not versed in electronics. Furthermore, any necessary controls or other adjustments of the battery circuit should be of the simple and non-technical type to minimize any user error which could cause damage since a battery having power capabilities for television receivers and the like would generally be relatively expensive.

An object of the present invention is to provide an improved power supply system for electronic apparatus, such as a television receiver, which supplies battery power and also automatically supplies power from an A.C. line to operate the apparatus or charge the battery when the power cord is connected between an outlet plug and the apparatus.

Another object is to provide such a power supply system which automatically regulates the battery charging current without attention by a user of the apparatus.

Another object is to provide an improved battery and A.C. power supply with a simple and effective filter for A.C. operation.

A feature of the invention is the provision of a transistorized portable television receiver operable from a self-contained battery by normal use of an on-off switch therefor and operable from the alternating current power line to energize the receiver or charge the battery by the normal use of the A.C. line cord and on-off switch without requiring any further manipulation or electronic knowledge of a user.

Another feature is the provision of electronic apparatus with an on-off switch and a switch operable with an A.C. line cord connected to the power line all for the purpose of establishing a battery circuit for operating the apparatus with the cord disconnected, an A.C. rectifier circuit for operating the apparatus with the cord connected, and a charging circuit for recharging the battery with the on-off switch turned off and the power cord connected.

Another feature is the provision of such a power supply system with regulating means in the charging circuit, including a control to automatically prevent overcharging of the battery and a circuit to "work" the battery to maintain its capacity during long periods of nonuse.

A further feature is the provision of a power supply system of the above described type used for a transistorized television receiver and having a transistor connected in series with the D.C. energization circuit for the receiver and a feedback network for controlling the transistor conduction inversely with the voltage ripple in the power supply potential for capacitor multiplying action and improved B+ filtering during alternating current operation of the system.

A specific form of the invention provides direct current energization for a transistorized portable television receiver. A self-contained rechargeable battery is used to operate the receiver through a normal on-off switch. By connecting a line cord between the receiver and a power line receptacle a "power type" switch is operated and the receiver is operable from the power line if the battery is removed, or discharged, or in order to conserve battery energy. With the power line cord connected and the receiver turned off, the battery is recharged from the power line. A current regulator and control relay is connected in the recharging circuit to regulate the battery charge and automatically disconnect the charging circuit when the battery reaches its full charge. The battery may also be discharged slightly during A.C. operation of the receiver for "working" the battery and helping to maintain its maximum life. Thus, the system is automatic and a user of the receiver need only operate an ordinary on-off switch and power line cord without devoting attention to the battery or charging thereof except to leave the power line cord plugged to the output receptacle when the receiver is not used, as is ordinarily done with the usual nonportable type television receivers.

For proper operation of a presently available cathode ray picture tube, the television deflection system may include voltage step-up transformer windings and rectifier circuits to produce the necessary high potentials which generally exceed the voltage produced by the battery power supply circuit. The power supply system may also include a transistor in the D.C. energization path for the receiver and capacitor multiplication circuitry to effectively filter the direct current applied during A.C. operation of the receiver.

Figures 1, 2, 3:
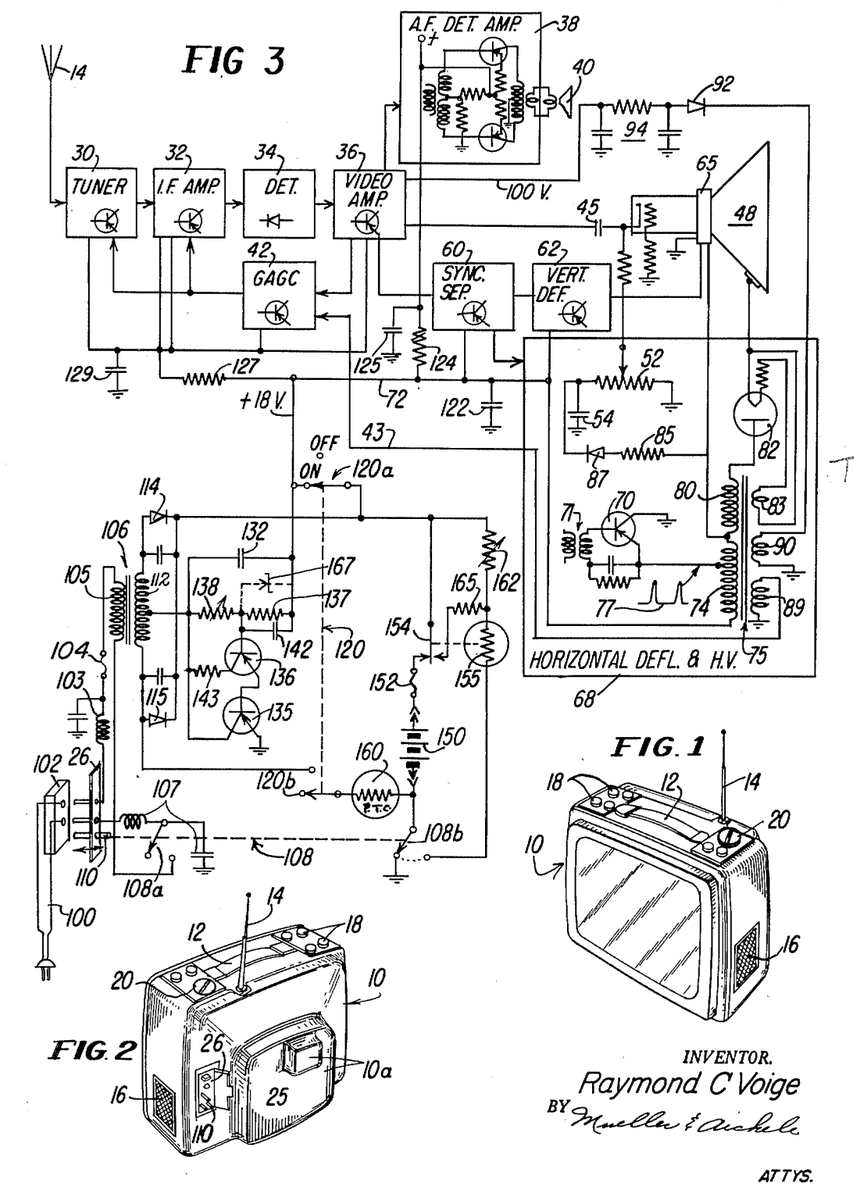
FIG. 1 is a perspective view of a portable television receiver in which the power supply system may be used.
FIG. 2 is a rear perspective view of the receiver of FIG. 1.
FIG. 3 is a schematic and block diagraam of a television receiver incorporating the invention.

Referring now to FIG. 1, the television receiver 10 may be battery operated or power line operated as will be explained subsequently. The receiver illustrated may be all transistorized except for the picture tube and high voltage rectifier. In the form shown, the receiver is enclosed in a housing with a handle 12 and an antenna 14. In the side of the receiver housing is a grill 16 through which the sound from an associated loudspeaker (not shown) is emitted. The control knobs 18 are for the purpose of adjusting contrast, brightness, etc., and the knob 20 is for channel selection purposes. As shown in FIG. 2, the back side of the receiver 10 incorporates a slight bulge 10a to accommodate the picture tube base and a self-contained battery. The back panel also includes a small door 25 which may be opened to expose the connector panel 26 to which a power line cord may be connected in case the receiver is operated from the alternating current power lines rather than its self-contained battery.

Considering FIG. 3, which is a diagram of the television receiver 10, there is shown a tuner 30 which selects signals from the antenna 14 and converts a selected signal to a fixed intermediate frequency for further amplification and selection in the IF amplifier 32. IF amplifier 32 is connected to the detector 34 which demodulates a received composite video signal incorporating frame synchronizing components, line synchronizing components, video frequency components and a modulated sound subcarrier. The demodulated composite signal is applied to the video amplifier 36 from which is derived the sound subcarrier and this signal is applied to the sound detector and amplifier 38 for demodulation, amplification and application to the loudspeaker 40. The demodulated television signal is also coupled through a direct current circuit of the detector 34 and the video amplifier 36 to the automatic gain control circuit 42. This circuit is gated by means of pulses occurring at the line deflection frequency and applied thereto by way of lead 43. The gain control circuit 42 is arranged to produce a direct current control potential having a value depending upon the strength of the received signal and this potential is applied to the tuner 30 and the IF amplifier 32 for controlling the gain of these stages.

After detection and amplification the video signals from amplifier 36 are applied through the blocking capacitor 45 to the cathode of the cathode ray picture tube 48. This cathode is also connected through an isolating resistor to the arm of a brightness control potentiometer 52. The fixed portion of the potentiometer 52 is connected across the filter capacitor 54 across which appears a direct current voltage produced from the horizontal deflection system. In this way, potentiometer 52 provides an adjustable direct current bias with respect to ground for the cathode ray tube 48.

The video amplifier 36 is further connected to the synchronizing signal separator circuit 60 which amplitude separates both the field or vertical and the line or horizontal synchronizing signal components from the remainder of the composite video signal. The vertical synchronizing signal, generally at 60 cycles per second, is applied to the vertical deflection circuit 62 which develops a suitable sawtooth scanning current in the beam deflection yoke 65 disposed on the neck of the cathode ray tube 48.

The synchronizing signal separator 60 is further connected to the horizontal deflection and high voltage system 68 which generates a suitable sawtooth scanning current at the line deflection frequency (generally 15.75 kc.) and a high voltage for the second anode of the cathode ray tube. The horizontal output transistor 70 is shown in the system 68 and suitably synchronized driver signals are applied thereto by way of transformer 71 to render transistor 70 cutoff during the retrace of the cathode ray beam in tube 48 and to cause heavy conduction of this transistor during the forward trace of the beam in the picture tube. During the beam scanning period when transistor 70 is conductive, its output current path is from the B+ lead 72 through the primary winding 74 of the horizontal output transformer 75 and the emitter-collector electrodes of transistor 70 to ground. As will be understood by those skilled in the art, a sawtooth deflection current is produced in the winding 74 and this is applied to the yoke 65 for beam deflection.

As will also be understood by those skilled in the television art, when the transistor 70 is cutoff, the primary winding 74, together with other inductances and capacitance connected thereto, will oscillate or ring at a retrace frequency thereby producing the voltage waveform 77 at the emitter of transistor 70. Such oscillation or ringing is permitted only for one-half of its cycle due to the reverse conduction of the transistor 70 (or conduction of a suitable damper diode not shown) and the ringing is stopped before the start of the next forward scanning signal. The high frequency energy thus developed in the primary winding 74, may be utilized for energizing further rectifier circuits connected to transformer 75. For example, the secondary winding 80 is connected to primary winding 74 and the high voltage terminal of the winding 80 is connected to the anode of high voltage rectifier 82. The filament of rectifier 82 is energized by a winding 83 of transformer 75 and a positive high voltage potential of 10 kv. or more is available at the filament of rectifier 82 for application to the second anode of cathode ray tube 48.

The pulse signal 77 developed in primary winding 74 is further coupled through the isolating resistor 85 to the anode of rectifier 87 and the cathode of this rectifier is coupled through filter capacitor 54 to ground. Accordingly, by means of this rectifier circuit a direct current potential is produced across a filter capacitor 54 and this potential is applied to the brightness control potentiometer 52 for biasing the picture tube 48 as previously explained. A further winding 89 of the transformer 75 is connected between ground and lead 43 in order to apply a proper gating pulse to the automatic gain control circuit 42.

An additional secondary winding 90 of transformer 75 is coupled between ground and the cathode of rectifier diode 92. The anode of this diode is connected through the filter network 94 to the video amplifier 36 in order to provide a negative voltage high with respect to ground for proper operation of the video amplifier transistor. As will be apparent subsequently, rectifiers 82, 92 and 87 and their associated circuits produce direct current voltages from the waveforms and associated transformer 75 of the horizontal deflection circuit. These direct current voltages may be substantially higher than the direct current potential which is used to energize the other portions of the receiver and which is applied to the receiver by way of B+ lead 72. It may be appreciated that many of the transistor stages of the entire television receiver can be operated from a direct current source of the order of 10 to 20 volts but that proper drive of the cathode ray picture tube 48 may require a signal and energizing potentials higher than this range.

Considering now the direct current energizing power supply for the receiver, there is a line cord 100 with an associated plug for connection to an alternating current wall-type receptacle for either A.C. operation of the receiver or charging of the receiver battery. The line cord 100 is connected to a female connector 102 which may be connected to the male connectors of the connector panel 26. These connectors are coupled respectively through line filter 103 and fuse 104 to one terminal of the primary winding 105 of the power transformer 106 and through line filter 107 and normally open switch section 108a to the other primary terminal. Female connector 102, when joined to the connector panel 26, is large enough to engage a pin 110 for operating switch 108. Accordingly, when the line cord 100 is connected to the receiver through the open door 25 (FIG. 2) pin 110 will be depressed (moved to the right in FIG. 3) to close switch section 108a and at the same time to operate switch section 108b. Obviously switch 108 and the pin 110 are spring biased to move to the illustrated positions thereof when the connector 102 is removed from engagement with panel 26. Switch section 108a insures that A.C. will be applied to the system only if switch section 108b is positioned to the right for non-battery operation so that the receiver is operative by only one power source. Thus, if connector 102 should work loose enough or be only partially inserted, to release switch 108 while remaining connected, only the battery would be connected for operation of the set and not both power sources. Switch 108 could also be associated with a line cord reel within the receiver housing so that withdrawal of the cord for use operated the switch.

The secondary winding 112 of power transformer 106 has end terminals coupled respectively to the anodes of diode rectifiers 114 and 115. The cathodes of these rectifiers are connected together and these are coupled directly to the movable arm of switch section 120a of the receiver on-off switch 120. The upper fixed contact of switch section 120a is connected to the B+ lead 72 of the television receiver. Accordingly, with this switch in the upper position as illustrated, a positive potential (which may be 18 volts in the particular receiver being discussed) produced at the cathodes of rectifiers 114 and 115 will be applied to the B+ lead 72. The receiver may be deenergized by moving switch 120 to the downward position. Lead 72 is connected directly to the synchronizing signal separator circuit 60, the vertical deflection circuit 62 and the horizontal deflection circuit 68. This lead is also bypassed to ground by means of filter capacitor 122. B+ lead 72 is further connected through a resistor 124 to the audio amplifier and detector system 38 and the audio signal side of resistor 124 is bypassed to ground by means of capacitor 125 in order to form a filter to prevent audio signals from entering other portions of the receiver. B+ lead 72 is further connected through a filter resistor 127 to the other stages of the receiver, namely stages 30, 32, 36 and 42. Resistor 127 is also connected to a filter capacitor 129 which is coupled to ground in order to bypass the RF, IF and video frequency components in these named stages.

It will be recognized that the rectifier diodes 114 and 115 are connected in a full wave circuit and that further additional filtering of the rectified potential will be required beyond that discussed immediately above. It should be pointed out that a receiver of the type being discussed will draw a comparatively heavy current (for example, of the order of 1.5 amperes), and therefore a comparatively large or effective filter must be used to reduce ripple of the rectifier 60 cycle input voltage from the power line.

To filter the D.C. output, filter capacitor 132 is connected between B+ lead 72 and a center tap of the secondary winding 112. However, for additional filtering under the severe filter requirements in this circuit transistors 135, 136 are used in a capacity multiplier circuit. Transistor 135 has a collector connected to the center tap of secondary winding 112 and an emitter which is connected to ground. Accordingly, the entire receiver current is carried in the collector-emitter path of this transistor when the receiver is operated from the power line. A direct current bias for the base of transistor 135 is developed at the emitter of transistor 136. Variable resistor 138 and resistor 137 are series connected respectively between the center tap of winding 112 and B+ lead 72. The junction of resistors 137, 138 is coupled to the base of transistor 136 for bias purposes. The capacitor 142 is connected between B+ lead 72 and the base of transistor 136 in order to apply the ripple component of the rectified direct current B+ voltage to the base electrode. The collector of transistor 136 is connected through current limiting resistor 143 to the center tap of winding 112.

Filter capacitor 132 reduces the ripple of the rectified direct current potential to an extent such that the remainder of the ripple can be effectively filtered by the transistorized filter circuit. In a practical situation the resultant ripple remaining across capacitor 132 may be about four volts peak-to-peak. Transistors 135, 136 effectively multiply the capacity of capacitor 142 and are equivalent to a capacitor so multiplied and connected across the load, namely from lead 72 to ground.

In considering the operation of the filter circuit it may be noted that if a single transistor is used as an active filter, such as would be the case if transistor 136 were omitted and capacitor 142 and resistors 137 and 138 were connected to the base of transistor 135, the capacity of capacitor 142 would be effectively multiplied by the beta of transistor 135. This is observable by considering the relationship between the input and output impedances of an emitter follower, namely:

$$Z_{out} = \frac{Z_{in}}{\beta+1}$$

and since $$Z_{in} = \frac{1}{wC}$$

then $$Z_{out} = \frac{1}{wC(\beta+1)}$$

If in a practical case capacitor 142 were 500 mf. and the transistor 135 had a beta of 50 (and in the case under consideration in which transistor 136 is omitted) the capacitor equivalence of the active filter would be a capacitor of 25,000 mf. Therefore, it may be seen that a single transistor active filter may provide a very effective means to remove a ripple voltage in the rectified direct current voltage.

However, in the television receiver presently under consideration, there is not only a varying input voltage to the active filter but the direct current load formed by the receiver also varies widely. For example, the class B push-pull audio output system shown in the sound circuit 38 of the television receiver may require a current varying from a few mils up to a maximum of 0.1 ampere. This current variation may occur at a syllabic rate in the case of voice audio signals. With such a wide range of current requirements from the power supply for the receiver, the result may be a modulation of the B+ potential which could cause a change in both the vertical size and the horizontal size of the television picture. It will be appreciated by those skilled in the art that there other circuits with large time constants in other portions of the receiver, for example, in the vertical deflection system 62, so that a B+ variation as being discussed herein can tend to emphasize the change in picture size because of an adverse effect on these time constant circuits. It should also be pointed out that a variation in B+ may occur due to variations in input line voltage from the power cord 100.

Accordingly, for such reasons the time constant of the filter action provided in the power supply for the receiver may well require more than the equivalent capacitor which can be provided by a one transistor active filter as reviewed in the above discussion. For example, the time constant of the filter for the B+ may have to be of a value many times longer than the time constant of any integrating or filter circuit utilized in the vertical deflection system 62 which operates at a frequency of 60 cycles per second. To successfully meet these very difficult requirements for adequate filtering, there is provided a transistorized active filter utilizing two transistors connected as previously described and shown in FIG. 3. In this form the effective beta of the transistors is given by the equation:

$$Beta_{total} = beta_1 \times \frac{beta_2}{alpha_2}$$

(where transistor 1 is in series with the load, such as transistor 135, and transistor 2 is in the base-drive circuit of the first transistor, such as transistor 136). In a system thus constructed with two transistors, it is entirely feasible to achieve a beta total of approximately 2500 so that if capacitor 142 has a value of 500 microfarads, the effective equivalent filter capacitor provided in the system would be equal to 1.25 farads. As will be understood by those familiar with the communications art, such a capacity is indeed very large and is generally considered to be impractical to provide in the usual communication apparatus.

Turning now to use of the receiver, for operation of the television receiver from the self-contained battery 150, the connector 102 is removed from the connector panel 26 which permits switch section 108b to move to the illustrated position in which the negative terminal of battery 150 is coupled through the arm of switch section 108b to the grounded fixed terminal of this switch section. The positive terminal of battery 150 is coupled through a fuse 152 and the normally closed contacts 154 of thermal relay 155 to the arm of switch section 120a. Thus, with switch 120 in the on or upward position and the A.C. line cord 100 disconnected from the television receiver, the battery 150 is connected between ground or the reference point and B+ lead 72. Obviously, turning switch 120 to the off or downward position will open the circuit to B+ lead 72 and turn the set off.

Battery 150 is preferably of the rechargeable type and the rectifier circuit may be utilized in recharging this battery. It may be seen that by connection of the line cord 100 both to a proper alternating current source and to the television receiver, the switch section 108b will be moved to the right as seen in FIG. 3 thereby disconnecting the negative terminal of the battery from the reference ground in the receiver. At the same time, of course, the switch section 108a will be closed and the rectifier system will be operative. Accordingly, if the switch 120 is in the on position the receiver will be operative from the alternating current power line but if the switch 120 is positioned in the off or downward position the battery may be recharged. With switch 120 in the downward position the contacts of switch section 120b will be closed. The negative terminal of battery 150 is connected through the positive temperature coefficient resistor 160 to the arm of switch section 120b and the fixed terminal of this switch section is coupled to the anode of rectifier 115.

Therefore, with the rectifier system energized and the switch section 120b closed, the battery will be coupled in series with the secondary winding 112 and the rectifier 114 which forms a half-wave rectifier system for recharging purposes. This half-wave circuit across the entire secondary winding of transformer 106 will give a somewhat higher voltage for charging than the full wave system used for the receiver. The positive temperature coefficient resistor 160 has the function of limiting current to the battery 150 and in case the line voltage should be abnormally high, this would tend to stabilize the applied potential and prevent battery damage.

Provision is also made for automatically disconnecting the charging circuit when the battery has reached full charge. For this purpose, thermal relay 155 is connected from the fixed contact of switch section 108b (which is connected to the negative side of the battery 150 when the switch 108 is operated), and through the variable resistor 162 to the cathode of rectifier diode 114. The resistor 162 is adjusted so that when the battery reaches full charge, and the load which the battery presents to the rectifier circuit permits the voltage across the battery to rise to a value indicative of full battery charge, relay 155 will energize and open the normally closed contacts 154. At this time the normally open contacts of the relay 155 will be closed and this will connect resistor 165 in parallel with resistor 162. Resistor 165 is for the purpose of increasing the current flow to relay 155 sufficiently that this relay will remain energized and maintain open the normally closed contacts 154.

It may be observed that a television receiver of the type described herein will sometimes be operated for a period of weeks or even months by energization from the A.C. power line to the exclusion of the self-contained battery. For example, during the winter months of the year a user of the receiver might seldom, if ever, operate the receiver from the self-contained battery. Under this condition the battery will receive some charging current each time the receiver is turned off and prior to the time that the relay 155 is energized to disconnect the charging circuit from the battery 150. Since the self-discharge rate of battery 150 may be very low, it is therefore possible that the battery will be stored for many months in an overcharged condition and this can be harmful to the battery.

In the circuit of FIG. 1 the battery 150 may be discharged by a small amount through the circuit including normally closed contacts 154, variable resistor 162, relay 155 and the contacts 108b established in the right hand position thereof at the time when the receiver is being operated from the A.C. power line. The rate of discharge may be low, depending upon the values of the resistances in this circuit, and may be expected to be less than 0.1 ampere. However, if the set is operated from the power lines for several hours some appreciable amount of current may be drawn from the battery. Then when the receiver is finally turned off the battery would be recharged through the charging circuit previously described. Therefore, the circuit will insure that the battery will always be "worked" to some extent when the receiver is merely operated from the A.C. power line and is not utilized to any extent over a period of days or weeks on a self-contained battery. This will reduce the loss of battery capacity due to chemical changes therein which may occur when the battery is stored in the fully charged condition. This will also eliminate the problem of overcharging and possible gassing of the battery.

In the power supply circuit of FIG. 3 there is a variable resistor 138 connected between the base of transistor 136 and the center tap of the secondary winding 112 of the power transformer. Variation of resistor 138 will provide an adjustment of the B+ potential in the receiver when it is operative from A.C. power. This will be accomplished through a change in the bias of transistor 136 and corresponding changes in the bias of transistor 135 to change the effective conduction thereof and thus the voltage drop thereacross which is in series with the load, or television receiver itself. Furthermore, adjustment of resistor 138 can be used to establish a proper B+ potential in an area where the A.C. power line voltage is unduly high. Variation of resistor 138 may also be used for the purpose of adjusting the B+ potential and thus the amplitude of the horizontal sweep signals developed by the horizontal deflection system 68 in order to provide an effective horizontal size control when the receiver is operated from the A.C. power line.

As a possible modification of the circuit of FIG. 3 it may be noted that the battery 150 could be charged from the rectifier system during the time when the receiver is also energized and operated from the rectifier system, rather than at the time when the receiver is connected to the power line but not otherwise used. To accomplish this the positive temperature coefficient resistor 160 could be connected directly to the anode of diode 115 rather than through the switch 120b. With this circuit revision and under the condition that the transformer 106 and the rectifier-diode 114 had sufficient current carrying capacity, the battery 150 would be charged when the receiver was connected to the power line regardless of whether or not the receiver was energized for viewing and listening purposes.

Under some conditions it may be desirable to stabilize the direct current bias voltage on the base of the transistor 136 and in order to do this the resistor 137 may be omitted and replaced by a zener diode 167. This diode would operate in conjunction with resistor 138 to provide a voltage divider across the B+ lead 72 and the center tap of the secondary winding 112 of transformer 106. With diode 167 in reverse conduction, the potential at the base of transistor 136 would be stabilized despite changes in B+ voltage and this in turn would stabilize the base voltage of transistor 135. It is desirable, of course, to stabilize the fixed bias voltages on transistors 135, 136 in order that these will respond only to the A.C. or ripple component of the B+ potential applied therethrough to the capacitor 142.

Figure 4:
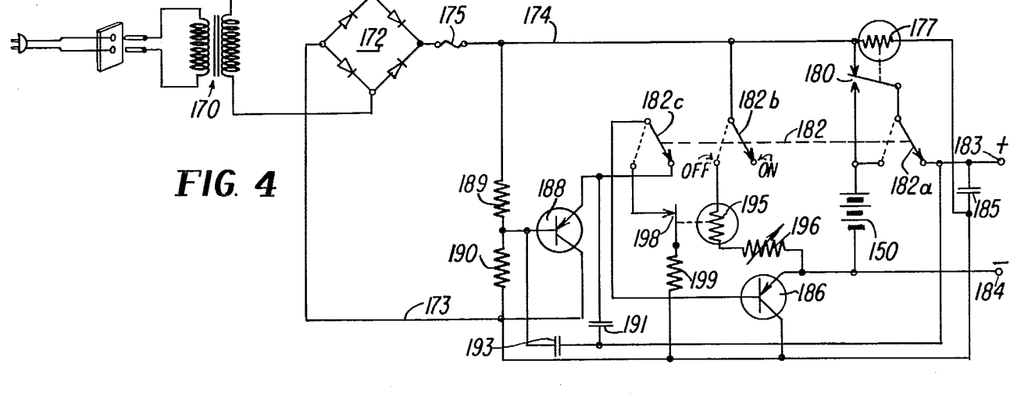
FIGS. 4 and 5 are schematic diagrams of further forms of the power supply system of the invention.

FIG. 4 shows a modified form of the invention including a power transformer 170 having a primary winding adapted to be connected to the alternating current power lines. The secondary winding of transformer 170 is coupled to a bridge rectifier circuit 172 and the direct current potential from the rectifier circuit is applied between negative bus 173 and lead 174 through a fuse 175. A relay 177 is connected between lead 174 and bus 173 and this relay will be energized when the power supply circuit is connected to the A.C. line. With relay 177 energized the contacts 180 will be closed in the upper position thereof and with the on-off switch section 182a in the illustrated or righthand position, the positive potential of lead 174 is applied to terminal 183. A filter capacitor 185 is connected between terminal 183 and bus 173 and the terminal 183 would be connected to the B+ lead 72 in the receiver circuit of FIG. 3.

Additional filtering of the rectified direct current potential is also provided by means of a transistorized feedback system which is comparable to that shown in the power circuit of FIG. 3. In the circuit of FIG. 4 terminal 184 is the negative terminal of the power supply and this would be connected to the common or ground point of the television receiver in FIG. 3. Terminal 184 is connected to the emitter of transistor 186 and the collector of this transistor is returned to the negative bus 173. Accordingly, it may be seen that the entire current of the television receiver would be conducted in the emitter-collector path of transistor 186 when the apparatus is operated from the alternating current power line. The base of transistor 186 is connected to the arm of switch section 182c of the receiver on-off switch 182. In the right hand or on position of this switch the base of transistor 186 is connected to the emitter of transistor 188. The collector of transistor 188 is connected to the negative bus 173. Bias for the base of transistor 188 is developed at the junction of resistors 189 and 190 which are series connected between B+ leads 174 and the negative bus 173. A capacitor 191 is connected from the B+ terminal 183 to the emitter of transistor 188 and a further capacitor is coupled from the B+ terminal 183 to the base of transistor 188.

The operation of the transistorized capacity multiplier filter circuit is like that described in FIG. 3 and it will be noted that any direct current ripple of the B+ potential appearing at terminal 183 will be coupled through capacitor 191 to the base electrode of transistor 186 so that the impedance of the emitter collector path of transistor 186 is varied directly with the positive excursions of ripple. Capacitor 193 also serves to feed the ripple signal to the base of transistor 188 and in this way the ripple appears in current amplified form at the emitter thereof which is directly coupled to the base of transistor 186. Therefore, an increased current component of the ripple of the B+ potential is conducted to the base of transistor 186 to ensure complete filtering of the output potential of the power supply. Thus effective values of capacitors 191, 193 are effectively multiplied in this system.

In order to turn off or deenergize the television receiver which is operated from the power supply of FIG. 4, it is obvious that switch 182 is moved to the off or left position in which case switch section 182a will connect the positive terminal of battery 150 through the contacts 180 of relay 177 and to the B+ lead 174. This will, of course, charge the battery when the power supply is disconnected from the television receiver. The negative terminal of battery 150 is connected to the emitter of transistor 186 and so the charging current for the battery is applied through the emitter-collector path of this transistor.

It may be noted that there is also a provision in the system of FIG. 4 for open circuiting the charging path for the battery 150 when the battery reaches full charge. A relay 195 is connected through variable resistor 196 to the negative terminal of battery 150 and through the left hand position of contacts 182b to the B+ lead 174. Resistor 196 is adjusted so that when the battery reaches full charge the relay 195 will be energized. When the relay 195 energizes, the normally closed contact 198 will be open and this will open circuit the base return path for transistor 186 which is established through the left hand position of contacts 182c, relay contacts 198 and resistor 199. When the base bias circuit of the transistor 186 is thus opened, this transistor will be cut off thereby breaking the charge current path between the negative bus 173 and the negative terminal of battery 150. The emitter-collector impedance of transistor 186 limits the battery charge current. Therefore, when the power transformer 170 is connected to the alternating current power line the television receiver may be operated by means of rectified current when the switch 182 is in the right hand position and the battery 150 may be charged when the switch 182 is in the left hand position, in which case the receiver is deenergized.

When the power transformer 170 is disconnected from the power line there will be developed no rectified potential from the rectifier circuit 172 between B+ lead 174 and the negative bus 172 so that relay 177 will be deenergized. Accordingly, relay 177 operates as a sensing relay to in effect respond to the type of power which is to operate the television receiver. With the relay 177 deenergized the downward or released position of contacts 180 will be closed thereby connecting the positive terminal of battery 150 through the switch section 182a. The negative terminal of battery 150 is connected to the negative output terminal 184 of the power supply and accordingly movement of switch 182 to the right or on position will connect the positive terminal of the battery 150 to the positive output terminal 183. Obviously movement of switch 182 to the left will break this energization circuit to the battery and the receiver can be turned on or off for battery operation by use of switch 182.

Figure 5:
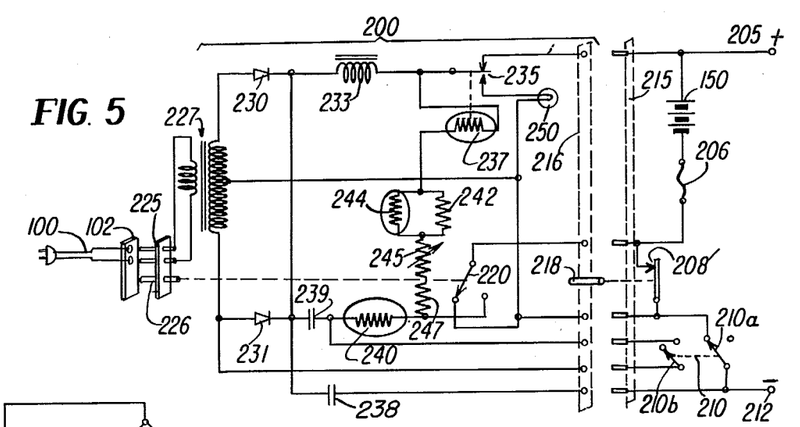

FIG. 5 shows a still further form of a power supply system of the invention. This system as illustrated contemplates that battery 150 will be self-contained within the television receiver but that the rectifier and charger circuit 200 will be incorporated in a separate housing arranged to be detachably connected electrically and mechanically to the housing of the television receiver proper. In this way the battery may be charged when necessary or the receiver could be operated by means of the alternating current power line but if battery operation alone were desired, it would not be necessary to transport the added weight and volume of the circuit 200. Obviously, as a variation however, the rectifier and charger system 200 could be incorporated at an integral part of the receiver.

In the circuit of FIG. 5 the battery 150 is connected to the B+ terminal 205 which is adapted to be connected to the B+ lead 72 of the television receiver of FIG. 3. The negative terminal of battery 150 is connected through a fuse 206 and the normally closed contacts of switch 208 and the contacts 210a of the receiver on-off switch 210 to the negative terminal 212. Terminal 212 would be connected to ground or the reference point in the receiver of FIG. 3. Accordingly, in the left hand position of on-off switch 210 the switch section 210a will complete the power circuit between the battery 150 and the television receiver. Obviously, moving switch 210 to the right position will open the contacts 210a, disconnect the battery and turn the receiver off.

For receiver operation by the alternating current power line or charging of the battery, the circuit 200 is connected to the circuitry associated with battery 150 by means of a plug 215 and the receptacle 216. With this connection a fixed pin 218 carried by the receptacle 216 is engageable with a movable contact of switch 208 to open this switch and thus open circuit the connection of the negative terminal of battery 150 to the switch section 210a. However, the receiver may still be operated from the battery if the line cord 100 is not connected since the normally closed contacts of switch 220 are bridged across the switch 208 through contacts of connectors 215 and 216.

Assuming now that the line cord 100 is connected through the female connector 102 to the male connector 225, the actuating pin 226 will be moved to the right thereby operating switch 220 to the right hand position. Switch 220 and pin 226 are spring biased normally to the left hand position. With the line cord connected, the power transformer 227 may be energized from a power line receptacle. The secondary of transformer 227 has end terminals connected individually to the anodes of rectifier diodes 230 and 231. The cathode of rectifier diode 231 is connected to the cathode of diode 230. The cathode of diode 230 is coupled through the filter choke 233 and the normally closed contacts 235 of relay 237 and the connectors 215, 216 to the B+ terminal 205. A center tap of the secondary winding of transformer 227 is connected through terminals of the connectors 215, 216 and through the left hand or on contact of switch section 210a to the negative terminal 212. Accordingly, a full wave rectifier circuit is formed to provide a B+ potential for operating the receiver. A filter capacitor 238 is connected from the negative terminal 212 and through terminals of the connectors 215, 216 to the cathode of diode 231. This capacitor in conjunction with choke 233 forms a filter for the power supply. Obviously, additional filtering can be provided either within the receiver or as part of the power supply circuit.

With the receiver switch 210 turned off, that is, in the right hand position thereof to open the contacts 210a, battery 150 may be charged through the rectifier circuit. In the right hand position of switch 210 the contacts 210b will be closed which connects the anode of rectifier 231 through respective pairs of contacts of connectors 215, 216 to the junction of capacitor 239 and resistor 240. The other side of capacitor 239 is connected to the cathode of diode 231. The other terminal of resistor 240 is connected through the contacts of switch 220, established in the right hand position thereof, through contacts of connectors 215 and 216 to the negative terminal of battery 150. Accordingly, with the apparatus connected to the alternating current power lines and the on-off switch in the off or left hand position, the secondary winding of transformer 227 is connected in series with the rectifier diode 230, choke 233, battery 150 and resistor 240. This forms a half-wave rectifier circuit for charging the battery. Resistor 240 has a positive temperature coefficient in order to limit the charging current to the battery in case of excess line voltage thereby preventing damage to the battery. During this charging operation capacitor 239 is connected from the cathode of diode 230 to the bottom terminal of the secondary winding of transformer 227 for filtering purposes since the resistance of resistor 240 may be high enough to render the normally high capacity of battery 150 ineffectual for filtering of the half-wave rectifier.

The circuit of FIG. 5 also incorporates means for automatically stopping the battery charging operation when the battery 150 has reached full charge. For this purpose the relay 237 is connected to the choke 233 (the positive potential lead) and through the parallel combination of resistor 242 and thermistor 244 and the variable resistor 245 and the fixed resistor 247 to the junction of resistor 240 with switch 220. Accordingly, the relay 237 is effectively connected across the battery 150 through the switch 220 and the relay contacts 235. Resistor 245 may be adjusted so that relay 237 will be energized when the potential across the battery as connected in the charging circuit has reached a value associated with full charge of the battery. When relay 237 is energized the normally closed contacts 235 are opened which open circuits the connection of the positive terminal of battery 150 with the positive lead of the rectifier circuit. With the relay contacts 235 established in the energized or down condition, a lamp bulb 250 is connected between the choke 233 and the center tap of secondary winding of transformer 227. Therefore, this bulb will be lighted by the upper section of the secondary winding and the lighting thereof may indicate that the relay 237 is energized and the battery has reached full charge. This provides a visual indication of the charge condition so that a user will know that the circuit 200 may be detached from the television receiver incorporating the battery 150.

In the above described power supply systems it may be noted that the television receiver can be operated from the power line without the presence of the battery 150 since this battery is not utilized as a necessary component of the system. Therefore, the receiver may be used in a normal manner either without the purchase of a battery or without the necessity of including the added weight of such a battery within the receiver housing if the receiver will be utilized only in the vicinity of a suitable alternating current power source. Furthermore, the power supply system requires only operation of a normal on-off switch and any sensing or determination of power line operation or battery-type operation is automatically made by regular, normal use of a power line cord. Furthermore, the battery may be automatically charged by means of the simple expedient of maintaining the receiver connected to the power lines with the receiver proper deenergized or turned off. A system of this type has the advantage that it may be easily used by persons not familiar with electricity since no attention need be given to making unusual connections or operating unfamiliar switches. Furthermore, provision is made for automatically limiting the charge current to the battery so that the chance of battery damage is greatly minimized. It may be appreciated that the battery of the type delivering sufficient power to operate a television receiver would be relatively expensive and that a system designed with proper safeguards to prevent damage through user error is very advantageous.

I claim:

1. In battery and power line operated electronic apparatus, the combination of rectifier means, a power line cord adapted to be connected to said rectifier means, a rechargeable battery, electronic apparatus to be powered from said rectifier means and said battery, an on-off switch for said apparatus having first contacts closed in an on position thereof and second contacts closed in an off position thereof, a power type switch having third contacts closed by connection of said line cord to said rectifier means and fourth contacts closed by disconnection of said rectifier means from said line cord, circuit means interconnecting said rectifier means, said battery, said apparatus and said switches, said circuit means including a first portion coupling said rectifier means to said electronic apparatus through said first contacts with said line cord connected to said rectifier means, said circuit means including a second portion coupling said battery to said electronic apparatus through said first and fourth contacts with said rectifier means disconnected from said line cord so that said electronic apparatus is energized from said battery and operation of said on-off switch to the off position thereof disconnects said battery from said electronic apparatus, and said circuit means including a third circuit portion coupling said battery to said rectifier means through said second contacts with said line cord connected to said rectifier means to thereby charge said battery with said on-off switch in the off position thereof, and means automatically operative upon a given charge condition of said battery for opening said third circuit portion to prevent overcharging said battery.

2. In battery and power line operated electronic apparatus, the combination of rectifier means adapted to be connected to a power line, a rechargeable battery, electronic apparatus to be powered from said rectifier means and said battery, an on-off switch for said apparatus having first contacts closed in an on position thereof and second contacts closed in an off position thereof, a power type switch having third contacts closed upon connection of said rectifier means to a power line and fourth contacts closed upon disconnection of said rectifier means from the power line, and circuit means interconnecting said rectifier means, said battery, said apparatus and said switches, said circuit means including a circuit portion coupling said rectifier means to said electronic apparatus through said first contacts with said rectifier means coupled to the power line, said circuit means including a circuit portion couplng said battery to said electronic apparatus through said first and fourth contacts with said rectifier means disconnected from the power line so that said electronic apparatus is energized from said battery and operation of said on-off switch to the off position thereof disconnects said battery from said electronic apparatus, and said circuit means including a circuit portion coupling said battery to said rectifier means through said second contacts with said rectifier means connected to the power line to thereby charge said battery with said on-off switch in the off position thereof, relay means, said circuit means including a circuit portion coupling said relay across said battery through said third contacts to energize said relay means upon a given charge condition of said battery, said relay means having contacts opened upon energization thereof for disconnecting said battery and said rectifier means to prevent overcharging said battery.

3. In a battery and power line operated television receiver, the combination of rectifier means, a power line connector adapted to be connected to said rectifier means, a rechargeable battery, a television circuit to be powered from said rectifier means and said battery, an on-off switch for said television circuit having first contacts closed in an on position thereof and second contacts closed in an off position thereof, a power type switch having an actuator engageable with a portion of said power line connector and third contacts opened upon connection of said rectifier means to said power line connector and closed upon disconnection of said rectifier means from said power line connector, and circuit means interconnecting said rectifier means, said battery, said television circuit, and said switches, said circuit means including a circuit portion coupling said rectifier means to said television circuit through said first contacts with said power line connector connected to said rectifier means, said circuit means including a circuit portion coupling said battery to said television circuit through said first and third contacts with said rectifier means disconnected from said power line connector so that said television circuit is energized from said battery and operation of said on-off switch to the off position thereof disconnects said battery from said television circuit, and said circuit means including a circuit portion coupling said battery to said rectifier means through said second contacts with said power line connector connected to said rectifier means to thereby charge said battery with said on-off switch in the off position thereof, and means automatically operative upon a given charge condition of said battery for disconnecting said battery and said rectifier means to prevent overcharging said battery.

4. In a battery and power line operated television receiver, the combination of rectifier means adapted to be connected to a power line, a rechargeable battery, a television circuit to be powered from said rectifier means and said battery, an on-off switch for said television circuit having first contacts closed in an on position thereof and second contacts closed in an off position thereof, a power type switch having third contacts closed upon connection of said rectifier means to a power line and fourth contacts closed upon disconnection of said rectifier means from the power line, and circuit means interconnecting said rectifier means, said battery, said television circuit, and said switches, said circuit means including a circuit portion coupling said rectifier means to said television circuit through said first contacts with said rectifier means connected to the power line, said circuit means including a circuit portion coupling said battery to said television circuit through said first and fourth contacts with said rectifier means disconnected from the power line so that said television circuit is energized from said battery and operation of said on-off switch to the off position thereof disconnects said battery from said television circuit, a current limiting resistor, and said circuit means including a circuit portion coupling said battery to said rectifier means through said resistor and second contacts with said rectifier means connected to the power line to thereby charge said battery with said on-off switch in the off position thereof, and means connected across said battery through said third contacts and operative upon a given charge condition of said battery for disconnecting said battery and said rectifier means to prevent overcharging said battery.

5. In a transistorized television receiver, the combination of a rectifier means providing one potential by full wave rectification and a higher potential by half wave rectification, said rectifier means being adapted to be connected to a power line, a rechargeable battery, a television circuit with power supply conductors to be energized from said rectifier means and said battery, an on-off switch for said television circuit having first contacts closed in an on position thereof and second contacts closed in an off position thereof, a power type switch having third contacts open upon connection of said rectifier means to a power line and closed upon disconnection of said rectifier means from the power line, circuit means interconnecting said rectifier means, said battery, said power supply leads, and said switches, said circuit means including a circuit portion coupling said rectifier means as a full wave rectifier to said power supply conductors through said first contacts with said rectifier means connected to the power line, said circuit means including a circuit portion coupling said battery to said power supply conductors through said first and third contacts with said rectifier means disconnected from the power line so that said television circuit is energized from said battery and operation of said on-off switch to the off position thereof disconnects said battery from said power supply conductors, and said circuit means including a circuit portion coupling said rectifier means as a half wave rectifier to said battery through said second contacts with said rectifier means connected to the power line to thereby charge said battery with said on-off switch in the off position thereof, means automatically operative upon a given charge condition of said battery for disconnecting said battery and said rectifier means to prevent overcharging said battery, and said television circuit having a deflection signal generator circuit coupled to said power supply conductors and having a transformer for voltage step up of a generated signal and a plurality of further rectifier circuits connected to said transformer to provide higher operating potentials for portions of said television receiver.

6. In battery and power line operated electronic apparatus, the combination of full wave rectifier means adapted to be connected to a power line to produce an output potential, a rechargeable battery, electronic apparatus to be powered from said rectifier means and said battery, an on-off switch for said apparatus having first contacts closed in an on position thereof and second contacts closed in an off position thereof, a power type switch having third contacts open upon connection of said rectifier means to a power line and closed upon disconnection of said rectifier means from the power line, circuit means interconnecting said rectifier means, said battery, said apparatus, and said switches, a transistor, said circuit means including a circuit portion coupling said rectifier means to said electronic apparatus through said transistor and said first contacts with said rectifier means connected to the power line, circuit means including a capacitor for applying a ripple component of the output potential of said rectifier means to said transistor for filtering the potential applied to said apparatus, said circuit means including a circuit portion coupling said battery to said electronic apparatus through said first and third contacts with said rectifier means disconnected from the power line so that said electronic apparatus is energized from said battery and operation of said on-off switch to the off position thereof disconnects said battery from said electronic apparatus, and said circuit means including a circuit portion coupling said battery to said rectifier means through said second contact with said rectifier means disconnected from the power line to thereby charge said battery with said on-off switch in the off postion thereof, and means automatically operative upon a given charge condition of said battery for disconnecting said battery and said rectifier means to prevent overcharging said battery.

7. In a battery and power line operated electronic apparatus, the combination of rectifier circuit means adapted to be connected to a power line, a rechargeable battery, electronic apparatus to be powered from said rectifier means and said battery, an on-off switch for said apparatus having first contacts closed on an on position thereof and second contacts closed in an off position thereof, relay means connected across said rectifier means to be operated by an output potential thereof, said relay means having first relay contacts closed upon connection of said rectifier means to a power line and second relay contacts closed upon disconnection of said rectifier means from the power line, and circuit means interconnecting said rectifier means, said battery, said apparatus and said switches, said circuit means including a circuit portion coupling said rectifier means to said electronic apparatus through said first switch contacts and said first relay contacts with said rectifier means coupled to the power line, said circuit means including a circuit portion coupling said battery to said electronic apparatus through said first switch contacts and said second relay contacts with said rectifier means disconnected from the power line so that said electronic apparatus is energized from said battery and operation of said on-off switch to the off position thereof disconnects said battery from said electronic apparatus, and said circuit means including a circuit portion coupling said battery to said rectifier means through said second switch contacts and said first relay contacts with said rectifier means connected to the power line to thereby charge said battery with said on-off switch in the off position thereof, and means automatically operative upon a given charge condition of said battery for disconnecting said battery and said rectifier means to prevent overcharging said battery.

8. In a transistorized television receiver, the combination of a television circuit with power supply conductors, a rechargeable battery, an on-off switch for said television circuit and having first contacts closed in the on position thereof and second contacts closed on the off position thereof, said television circuit, said battery and said on-off switch all being enclosed within a first housing, rectifier circuit means adapted to be connected to a power line, a power-type switch having first-power type switch contacts closed upon connection of said rectifier means to a power line and second power-type switch contacts closed upon disconnection of said rectifier means from said power line, said rectifier circuit means and said power type switch being enclosed within a second housing, circuit means interconnecting said power supply conductors, said battery, said switches and said rectifier means and including detachable connecting means for intercoupling said first and second housings, said circuit means including a circuit portion coupling said rectifier means to said power supply conductors through said first contacts and said first power-type switch contacts with said rectifier means coupled to the power lines, said circuit means including a circuit portion coupling said battery to said power supply conductors through said first contacts and said power-type switch contacts with said rectifier means disconnected from the power line so that said television receiver is energized from said battery and operation of said on-off switch to the off position thereof disconnects said battery from said power supply conductors, and said circuit means including a circuit portion coupling said battery to said rectifier means through said second and said second power-type switch contacts with said rectifier means connected to the power line to thereby charge said battery with said on-off switch in the off position thereof, and means operative upon a given charge condition of said battery for disconnecting said battery and said rectifier means to prevent overcharging of said battery.

9. A transistorized television receiver, including in combination, a plurality of television receiver stages together comprising an electric load, rectifier circuit means adapted to be connected to a power line to produce a rectified potential, a first transistor having input and output electrodes, circuit means coupling said rectifier circuit means to said load through said output electrodes of said first transistor, a second transistor having input and output electrodes, a voltage divider network, means connecting said voltage divider network to said rectifier circuit means and to said input electrode of said second transistor to provide a bias therefor, a first filter capacitor means connecting said first capacitor to said load, a second filter capacitor, means connecting said second capacitor between said load and said input electrode of said second transistor, and circuit means coupling said output electrode of said second transistor to said input electrode of said first transistor so that conduction of said first transistor is varied inversely as a function of ripple voltage of the rectified potential produced by said rectifier circuit means and applied to said first transistor through said second capacitor for increasing the filtering effectiveness of said second capacitor.

10. In a battery and power line operated television receiver, the combination of rectifier circuit means, a power line connector adapted to be connected to said rectifier circuit means, a rechargeable battery, a television receiver circuit to be powered from said rectifier circuit means and said battery, an on-off switch for said receiver circuit having first contacts closed in an on position thereof and second contacts closed in an off position thereof, a power type switch having an actuator engageable with a portion of said power line connector and first power type switch contacts closed upon connection of said rectifier circuit means to said power line connector and second power type switch contacts closed upon disconnection of said rectifier circuit means from said power line connector, a battery discharge circuit connconnected between said first contacts and said first power type switch contacts, and circuit means inter-connecting said rectifier circuit means, said battery, said television receiver circuit and said switches, said circuit means including a circuit portion coupling said rectifier circuit means to said television receiver circuit through said first contacts with said power line connector connected to said rectifier circuit means, and said battery discharge circuit across said battery through said first power type switch contacts, said circuit means further including a circuit portion coupling said battery to said television receiver circuit through said first contacts and said second power type switch contacts with said rectifier circuit means disconnected from said power line connector so that said television receiver circuit is energized from said battery and operation of said on-off switch to the off position thereof disconnects said battery from said television receiver circuit, and said circuit means further including a circuit portion coupling said battery to said rectifier circuit means through said second contacts with said power line connector connected to said rectifier circuit means thereby to charge said battery with said on-off switch in the off position thereof.

11. A transistorized television receiver, including in combination, a plurality of television receiver stages together comprising an electric load, rectifier circuit means adapted to be connected to a power line to produce a rectified potential, a battery providing an energizing potential for said receiver, an energizing circuit for said receiver including switch means for selectively connecting said battery and said rectifier circuit means to said receiver stages, said energizing circuit including a pair of power conductors and a first transistor having input and output electrodes with the output electrodes thereof connected in series with said load and said conductors, a second transistor having input and output electrodes, a bias network and means connecting the same between one of said power conductors and said input electrode of said second transistor to provide a bias therefor, a first filter capacitor and means connecting the same between said conductors, a second filter capacitor and means connecting the same between one of said conductors and said input electrode of said second transistor, a zener diode and means connecting the same between one of said conductors and said input electrode of said second transistor, and means connecting said output electrode of said second transistor to said input electrode of said first transistor so that conduction of said first transistor is varied inversely as a function of unregulated voltage applied to said first transistor through said second capacitor thereby increasing the filtering effectiveness of said second capacitor.

12. A transistorized television receiver, including in combination, a plurality of television receiver stages together comprising an electric load, rectifier circuit means adapted to be connected to a power line to produce a rectified potential, a battery providing an energizing potential for said receiver, an energizing circuit for said receiver including switch means for selectively connecting said battery and said rectifier circuit means to said receiver stages, said energizing circuit including a pair of power conductors and a transistor having input and output electrodes with the output electrodes thereof connected in series with said load and said conductors, voltage responsive means connected between said conductors and connected to said input electrode for varying the conduction of said transistor inversely with respect to voltage variations in said energizing circuit, charging circuit means connecting said battery to said rectifier circuit for charging said battery, and further circuit means connected to said battery and operative upon a given charged condition thereof to open said charging circuit means.

13. In a battery and power line operated television receiver, the combination of rectifier circuit means adapted to be connected to a power line, a rechargeable battery, transistorized television receiver stages comprising electronic apparatus to be powered from said rectifier means and said battery, an on-off switch for said apparatus having first contacts closed on an on position thereof and second contacts closed in an off position thereof, relay means connected across said rectifier means to be operated by an output potential thereof, said relay means having first relay contacts closed upon connection of said rectifier means to a power line and second relay contacts closed upon disconnection of said rectifier means from the power line, and circuit means interconnecting said rectifier means, said battery, said apparatus and said switches, said circuit means including a portion coupling said rectifier means to said electronic apparatus through said first switch contacts and said first relay contacts with said rectifier means coupled to the power line, said circuit means coupling said battery to said electronic apparatus through said first switch contacts and said second relay contacts with said rectifier means disconnected from the power line so that said electronic apparatus is energized from said battery and operation of said on-off switch to the off position thereof disconnects said battery from said electronic apparatus, said circuit means including a portion coupling said battery to said rectifier means through said on-off switch and said first relay contacts with said rectifier means connected to the power line to thereby charge said battery.

14. In a television receiver, the combination of a transistorized television circuit with energizing power supply conductors therefor, a rechargeable battery, an on-off switch for said television circuit and having first contacts closed on the on position thereof and second contacts closed on the off position thereof, said television circuit, said battery and said on-off switch all being enclosed within a first housing, rectifier circuit means adapted to be connected to a power line, a power-type switch having first power-type switch contacts closed upon connection of said rectifier means to a power line and second power-type switch contacts closed upon disconnection of said rectifier means from said power line, said rectifier circuit means and said power type switch being enclosed within a second housing, circuit means interconnecting said power supply conductors, said battery, said switches and said rectifier means and including detachable connecting means for intercoupling said first and second housings, said circuit means including a portion coupling said rectifier means to said power supply conductors through said first contacts and said first power type switch contacts with said rectifier means coupled to the power lines, said circuit means coupling said battery to said power supply conductors through said first contacts and said second power-type switch contacts with said rectifier means disconnected from the power line so that said television receiver is energized from said battery and operation of said on-off switch to the off position thereof disconnects said battery from said power supply conductors, and said circuit means including a portion coupling said battery to said rectifier means through said on-off switch and said first power type switch contacts with said rectifier means connected to the power line to thereby charge said battery.

15. A transistorized television receiver, including in combination, rectifier means, a power line cord connected to said rectifier means, a rechargeable battery self contained in said receiver, a plurality of transistorized television receiver stages to be powered from said rectifier means and said battery, an on-off switch for said receiver having first contacts closed in an on position thereof and second contacts closed in an off position thereof, a power type switch having third contacts closed by connection of said line cord for energization of said rectifier means and fourth contacts closed by de-energization of said rectifier means from said line cord, circuit means interconnecting said rectifier means, said battery, said receiver stages and said switches, said circuit means including a portion coupling said rectifier means to said receiver stages through said first contacts with said line cord connected for energizing said rectifier means, said circuit means including a portion coupling said battery to said receiver stages through said first and fourth contacts with said rectifier means de-energized from said line cord so that said receiver stages are energized from said battery and operation of said on-off switch to the off position thereof disconnects said battery from said stages, and said circuit means including a portion coupling said battery to said rectifier means through said second contacts with said line cord energizing said rectifier means to thereby charge said battery with said on-off switch in the off position thereof.

16. A transistorized television receiver, including in combination, rectifier means, a power line cord connected to said rectifier means, a rechargeable battery self contained in said receiver, a plurality of transistorized television receiver stages to be powered from said rectifier means and said battery, an on-off switch for said receiver, a power type switch and means to operate the same in response to connection of said line cord for energization of said rectifier means, circuit means interconnecting said rectifier means, said battery, said receiver stages and said switches, said circuit means including a portion coupling said rectifier means to said receiver stages through said on-off switch with said line cord connected for energizing said rectifier means, said circuit means including a portion coupling said battery to said receiver stages through said on-off switch and said power-type switch with said rectifier means de-energized from said line cord so that said receiver stages are energized from said battery and operation of said on-off switch to the off position thereof disconnects said battery from said stages, said circuit means including a portion coupling said battery to said rectifier means through one of said switches with said line cord energizing said rectifier means to thereby charge said battery, and means automatically operative upon a given charge condition of said battery for opening the last named portion of said circuit means to prevent overcharge of said battery.

References Cited in the file of this patent

UNITED STATES PATENTS 2,796,520     Kreithen  ---------------- June 18, 1957

OTHER REFERENCES

RCA TN No.: 102 Transistorized Filter for D.C. Power Supply, Harold J. Paz, March 12, 1958.